United States Patent [19]

Bayless

[11] 4,073,946

[45] Feb. 14, 1978

[54] PROCESS OF FEEDING LARVAL MARINE ANIMALS

[75] Inventor: Robert G. Bayless, Yellow Springs, Ohio

[73] Assignee: Capsulated Systems, Incorporated, Yellow Springs, Ohio

[21] Appl. No.: 558,835

[22] Filed: Mar. 17, 1975

Related U.S. Application Data

[62] Division of Ser. No. 344,904, March 26, 1973, Pat. No. 3,922,373.

[51] Int. Cl.$^2$ .............................................. A23K 1/18
[52] U.S. Cl. ...................................... 426/2; 426/573; 426/656; 426/657
[58] Field of Search .................. 426/1, 2, 89, 98, 805, 426/573, 576, 575, 656, 657; 252/316

[56] References Cited

U.S. PATENT DOCUMENTS

| | | | |
|---|---|---|---|
| 2,800,457 | 7/1957 | Green et al. | 252/316 |
| 2,800,458 | 7/1957 | Green | 252/316 |
| 3,137,630 | 6/1964 | Hecker et al. | 426/576 X |
| 3,421,899 | 1/1969 | Humphreys | 426/1 |
| 3,437,488 | 4/1969 | Humphreys | 426/1 |
| 3,589,910 | 5/1971 | Nesmeyanov et al. | 426/656 X |
| 3,684,519 | 8/1972 | Combs | 426/1 |
| 3,726,689 | 4/1973 | Patashnik | 426/1 |
| 3,730,728 | 5/1973 | Patashnik et al. | 426/1 |
| 3,876,803 | 4/1975 | Stephan et al. | 426/1 |
| 3,891,570 | 6/1975 | Fukushima et al. | 252/316 |

*Primary Examiner*—Raymond N. Jones
*Assistant Examiner*—Esther M. Kepplinger
*Attorney, Agent, or Firm*—Jacox & Meckstroth

[57] ABSTRACT

A process of manufacturing substantially-homogeneous, stable microglobule of hydrophilic polymeric material, having oil-insoluble payload material dispersed therein; the microglobule; and methods of using the microglobules particularly in mariculture as balanced-diet nutrient materials.

3 Claims, No Drawings

PROCESS OF FEEDING LARVAL MARINE ANIMALS

RELATED APPLICATION

This is a division of application Ser. No. 344,904, filed on Mar. 26, 1973, now U.S. Pat. No. 3,922,373.

BACKGROUND OF THE INVENTION

This invention is particularly directed to a manufacturing process for making minute, substantially homogeneous globules, generally termed herein as microglobules, which include a matrix material of hydrophilic, film-forming, polymeric material (such as gelatin), having dispersed therein oil-insoluble payload material, which payload material may be either water soluble or water-insoluble but is at least water-wettable and water-dispersible.

The art has long taught methods of making substantially non-homogeneous microparticles, namely, microcapsules having discrete zones of solid exterior wall-material and internal payload material, the latter generally being liquid. the microcapsules of the art have largely been made by coacervation, that is liquid-liquid phase separation, and have generally been limited to microcapsules having hydrophobic wall material containing hydrophilic payload material on the one hand or microcapsules having hydrophilic wall material containing hydrophobic payload material on the other. Representative of the art are the following patents: U.S. Pat. No. 2,800,458 (Green) and U.S. Pat. No. 2,800,457 (Green & Schleicher), which teach the manufacture of microcapsules by coacervation wherein the microcapsules have hydrophilic wall material and oily internal-phase payload material, made by coacervation of hydrophilic, polymeric, film-forming material in an aqueous external vehicle, to wrap and encapsulate oil-droplets dispersed in the aqueous vehicle; U.S. Pat. No. 3,589,910 (Nesmeyanov et al.) which teaches the incorporation of generally oil-insoluble payload material droplets in hydrophilic wall-material by coacervation within an aqueous droplet, which aqueous droplet originally contains both the wall material and the payload material and which droplet is dispersed in an oil vehicle; and British Pat. No. 931,148 (Wagner) which teaches the manufacture of microcapsules by coacervation wherein the microcapsules have hydrophobic wall material and aqueous internal-phase payload material, made by coacervation of hydrophobic polymeric film-forming material in an oily external vehicle to wrap and encapsulate aqueous droplets dispersed in the oil vehicle.

DESCRIPTION OF THE PREFERRED EMBODIMENT

The process of this invention provides a substantially homogeneous microglobule, having oil-insoluble (optionally) water-soluble) payload material dispersed through hydrophilic, polymeric, film-forming matrix material, which microglobules are readily and cheaply made and which are stable on storage.

The process of this invention is best understood by consideration of the following specific examples, which examples will be further elucidated and exemplified in the discussion to follow.

EXAMPLE 1

150 grams: finely ground cod-fish meal
250 grams: gelatin solution (10%, in water)
500 milliliters: cottonseed oil
400 milliliters: freon 113
25 milliliters: glutaraldehyde solution (25%, in water)
900 milliliters: acetone The cod meal and gelatin solution were blended in a high-speed attritor or blender to give a smooth paste. With continued agitation the cottonseed oil (preheated to 50° C.) was added to the cod meal-gelatin paste. The temperature was maintained near 50° C., while agitation was continued to give a fine homogeneous dispersion of the cod meal-gelatin mixture in the cottonseed oil. Half of the fluorocarbon dilute was added to the dispersions to dilute and cool the dispersion simultaneously. With continued agitation, the temperature of the dispersion was allowed to fall to 30° C. at which point the glutaraldehyde solution was added to cross-link the now gelled gelatin matrix. The mixture was then cooled to less than 15° C., further diluted with the remaining flurocarbon diluent and agitated for an additional 30 minutes. The mixture was then poured into 500 milliliters of the acetone and suction filtered to give a powder cake which was further washed with the remaining acetone in two positions. The filter cake was air-dired to give a free-flowing powder, of cod fish meal dispersed throughout micro-fine globules of a cross-linked gelatin matrix.

In the above preparation, similar results were obtained when 25 gms. of gelatin were (1) replaced by 10 gms. of chitin, and (2) replaced by 20 gms. of hydroxy ethyl cellulose.

Other external vehicle materials which have been found useful are, and can be used in place of cottonseed oil, Freon
Cyclohexane
Toluene
Xylene
Linseed Oil
Vegetable Oil
Cod Oil
Motor Oil
Silicone Oil
Paraffin Oil Other materials useful for the replacement of the fluorcarbon diluent include aromatic, cyclic, aliphatic hydrocarbons and other halogenated hydrocarbons. The use of diluent, represented as fluorocarbon above is optional but preferred.

The process of this invention readily gives useful microglobules of a size of about 1 to 1000 microns. Microglobules of a diameter of about 5 to 100 microns are preferred, particularly for mariculture uses.

EXAMPLE 2

500 grams: trout chow
75 grams: gelatin
2 kilogram: water
10 kilogram: cottonseed oil
75 millimeters: glutaraldehyde solution (25%, in water)
500 millimeters: fluorocarbon diluent (such as trichloro-trifluoroethane)
5 kilogram: acetone A standard trout chow diet commonly includes the following materials, fish meal, soybean meal, ground wheat, corn gluten meal, brewers dried yeast, ground yellow corn, wheat middlings, dried blood meal, dried whey, vitamins, minerals, thiacin, niacin, etc.

The gelatin was allowed to swell in cold distilled water for 30 minutes and was then heated with stirring to 55° C. and blended with the trout chow in a high speed blender to give a smooth paste. The paste was added to the cottonseed oil (preheated to 40–45° C.) with continued agitation to give a dispersion of the paste in the cottonseed oil, at a temperture, maintained above 35° C. The mixture was then chilled to 10–15° C. and treated by the addition of the glutaraldehyde solution, while vigorous stirring was maintained for 2 hours. With continued agitation, the dispersion was diluted with the fluorocarbon diluent and poured into 2 kilograms of acetone. The mixture in acetone was suction-filtered, washed three times with 1 kilogram portion of acetone and air dried.

EXAMPLE 3

(YEACO-20) Yeast single cell yeast protein 100 gms.: single cell yeast protein (YEACO-20)
15 gms.: gelatin
400 gms.: water
1500 gms.: cottonseed oil
15 gms.; glutaraldehyde solution (25% in water)
100 gms.: cyclohexane
1000 gms.: acetone The gelatin was allowed to swell in cold distilled water for 30 minutes and warmed to 55° C. The single cell protein (SCP) was blended into the gelatin solution to give a smooth paste. This paste was emulsified in the preheated (to 35° C.) cottonseed oil to obtain small globules (15 to 35 microns). The mixture was then chilled to a temperature below 20° C. and treated with the glutaraldehyde solution, with vigorous stirring for 2 hours. The mixture was diluted with cyclohexane, suction-filtered, and the residue cake redistributed in 500 ml. of agitated acetone. The mixture in acetone was suction-filtered, washed three times with aliquots of acetone and air dried.

EXAMPLE 4

Within a tank conaining sea water, vertebrate/invertebrate animals, for example, shrimp larvae and crayfish, were maintained and were fed the microglobules of Example 1. The shrimp and crayfish showed a faster growth rate than experienced with conventional meat meal.

The above examples are set out to teach preferred processes. Many hydrophilic, polymeric, film-forming, cross-linkable materials, other than gelatin have been successfully used, including chitin, zein, gum arabic and other natural gum, as well as synthetic polymers such as hydoxy ethyl cellulose, methyl cellulose, and poly(vinyl alcohol). "Hydrophilic" as used herein means water-soluble or dispersible in water to give a macromolecular dispersion. The hydrophilic polymeric material used herein remains water-wettable after cross linking. "Cross-linkable" is used herein to describe those polymeric materials which are tannable, that is those which have reactive sites capable of reacting with common tanning agents. In particular, cross-linkable polymeric materials have active hydrogen sites, capable of adding to carbonyl groups such as those found in the tanning aldehydes, particularly di-aldehydes such as the preferred glutaraldehyde, used herein. Mono-aldehydes such as formaldehyde are eligible for use herein as gelatin insolublizing agents, but dialdehydes, which are actually capable of cross-linking, are preferred. Other eligible di-aldehydes include lower-alkyl-substituted glutaraldehydes, adipic aldehyde and lower-alkyl-substituted adipic aldehyde, as well as succinic aldehyde and various aldehyde-generators, known in the art, which can be caused to deliver di-aldehydes on situ. Exemplary of eligible aldehyde-generators are bisulphite addition complexes of aldehydes as well as acetals, particularly 2,5-di-hydro 2,5-di-lower-alkoxy furanes.

The payload material, dispersed in the polymer matrix of the microglobules, described herein, can be widely varied both as to kind and as to relative amounts present. The payload materials can make up as little of the microglobule as desired or up to about 95% of the total weight of the microglobules. The range of components which may be included in the payload material is limited only by the requirement that the payload material be finely dispersible and be oil-insoluble. Included among oil-insoluble materials are oil-in-water dispersion droplets or droplets of oil dispersed in oil-insoluble material other than water which are oil-insoluble because such dispersion droplets present an envelope or other oil-insoluble material of water to the surrounding oil vehicle.

The microglobules are of particular use in mariculture, where the payload material is a balanced-diet material for a specific marine organism. The microglobules are particularly useful in feeding larval stages of shrimp, lobster, fish, and bi-valve cultures such as oysters, abalone and scallops, allowing the delivery of a water-stable nutrient package, directly to the developing animal. When marine animals, in their minute larval stages, are fed the microglobules here disclosed, maximum attention can be given to analysis of nutritional requirements, in view of the minimal loss of nutrients from the microglobules suspended in the aqueous environment of the marine animals. Furthermore, microglobule rations minimize build up of organic levels in the aqueous environment, permitting more rigid controls over water quality in order to avoid the adverse effect on animal survival and growth which are commonly encountered by artificial feeding methods that affect the oxygen and pH of the supporting aqueous system.

The use of the microglobules of this invention allows the replacement of traditional larval food in mariculture. Although commercial varieties of larval shrimp feed readily on *Artemia nauplii*, larval brine shrimp, the food value of Artemia is not optimal. Furthermore, brine shrimp larva are quite expensive when used to feed commercial shrimp larva even on a laboratory to small pilot-plant scale. The use of brine shrimp larva is further complicated by variations in seasonal and geographic availability as well as the possible absorption and concentration of undesirable chemicals, such as DDT and other poly-chlorinated benzene derivative in the food-chain of naturally raised marine species. In the larval culture of shrimp or fish, a certain amount of payload-leaching from the microglobule is desirable in order to attract the marine species and stimulate its feeding response. The required concentration gradient of nutrient material, which a marine species must encounter in order to be attracted thereto and to have its feeding response stimulated, varies from species to species as well as at different stages of growth within each species. The use of the microglobules of this invention allows the payload-leaching rate to be varied at will, as the feeding culture requires. The leaching rate of payload material from the microglobules of this invention can be increased by increasing the ratio of payload material and matrix material and also by decreasing the amount of cross-linking agent used in the preparation of the microglobules. If the cross-linking step of the above-described process is omitted altogether, the matrix material of the microglobule will be completely water soluble, and a rapid rate of payload leaching will be obtained. Furthermore, the microglobules of this invention serve as an excellent vehicle for the introduction of hormones and other regulatory chemical substances which are required in trace concentrations to influence behavior, moulting, sex change, and growth in the larval animal. Furthermore, therapeutic agents may be added to the diet package of the payload material for use in treating larval animals under conditions of stress or disease outbreak.

The invention having thus been described, the following is claimed:

1. The process of feeding larval marine animals, comprising the step of adding to the aqueous support system of the larval marine animals water-stable, substantially homogeneous, microglobules of hydrophilic, polymeric, cross-linked, film-forming material, having oil-insoluble nutrient material dispersed therein, and having a diameter of about 1 to 1000 microns.

2. The process of claim 1 wherein the microglobules have been prepared by a process comprising the steps of:
   (A) Providing a continuous-phase vehicle material of water-immiscible liquid;
   (B) Providing a discontinuous phase of solid material as discrete, minute particles, dispersed in said continuous phase vehicle material, wherein said discontinuous phase material consists substantially of hydrophilic polymeric cross-linkable film-forming material having oil-insoluble nutrient material dispersed therein;
   (C) Subsequently adding a liquid water-soluble cross-linking agent, with agitation, to the dispersion of discontinuous phase particles and the continuous-phase vehicle to harden the discontinuous-phase particles and form stable, substantially homogenous microglobules thereof of about 1 to 1000 micron size.

3. The process of claim 2 wherein the hydrophilic polymeric material is gelatin and the cross-linking agent is glutaraldehyde.

* * * * *

UNITED STATES PATENT OFFICE
CERTIFICATE OF CORRECTION

Patent No. 4,073,946   Dated February 14, 1978

Inventor(s)   Robert G. Bayless

It is certified that error appears in the above-identified patent and that said Letters Patent are hereby corrected as shown below:

Column 1, line 23, capitalize the word "the", following the period.

Column 1, line 58, omit the parenthesis after "tionally".

Column 4, line 49, "nauplii" should not be italicized.

Column 4, line 50, "artemia" should be italicized.

Column 6, line 20, change "nous" to -- neous --.

Signed and Sealed this

Eighteenth Day of July 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,073,946
DATED : February 14, 1978
INVENTOR(S) : Robert G. Bayless It is certified that error appears in the above-identified patent and that said Letters Patent are hereby corrected as shown below:

Column 1, between lines 52 and 53, insert the following:

In summary the art has taught the production of non-homogeneous payload-incorporating microcapsules made by liquid-liquid phase separation wherein (1) hydrophilic polymeric film-forming material is caused to come out of aqueous solution (either from the external-vehicle phase as in Green and Green and Schleicher or from the internal-phase droplet as in Nesmeyanov et. al.) To wrap and enclose generally-liquid payload material, which in the teaching of Green and the teaching of Green and Schleicher is oily payload material, and in the Nesmeyanov et. al. teaching may include water-soluble materials, or (2) hydrophobic polymeric film-forming material is caused to come out of aqueous solution to wrap and enclose generally-liquid aqueous payload material as in the Wagner British patent.

UNITED STATES PATENT AND TRADEMARK OFFICE
CERTIFICATE OF CORRECTION

PATENT NO. : 4,073,946

DATED : February 14, 1978

INVENTOR(S) : Robert G. Bayless

It is certified that error appears in the above—identified patent and that said Letters Patent are hereby corrected as shown below:

Commercial microencapsulation practice in the United States has been limited, as far as is known, to the encapsulation of oily payload material with hydrophilic wall material because of the difficulty and expense of encapsulating aqueous payload material and because of the instability of water-containing microcapsules. By instability is meant the tendency of water-containing microcapsules to lose their aqueous content on storage.

Signed and Sealed this

Fifth Day of September 1978

[SEAL]

Attest:

RUTH C. MASON
Attesting Officer

DONALD W. BANNER
Commissioner of Patents and Trademarks